May 21, 1929.                    C. C. FARMER                     1,714,009
                              PISTON TRAVEL INDICATOR
                                 Filed Nov. 29, 1926
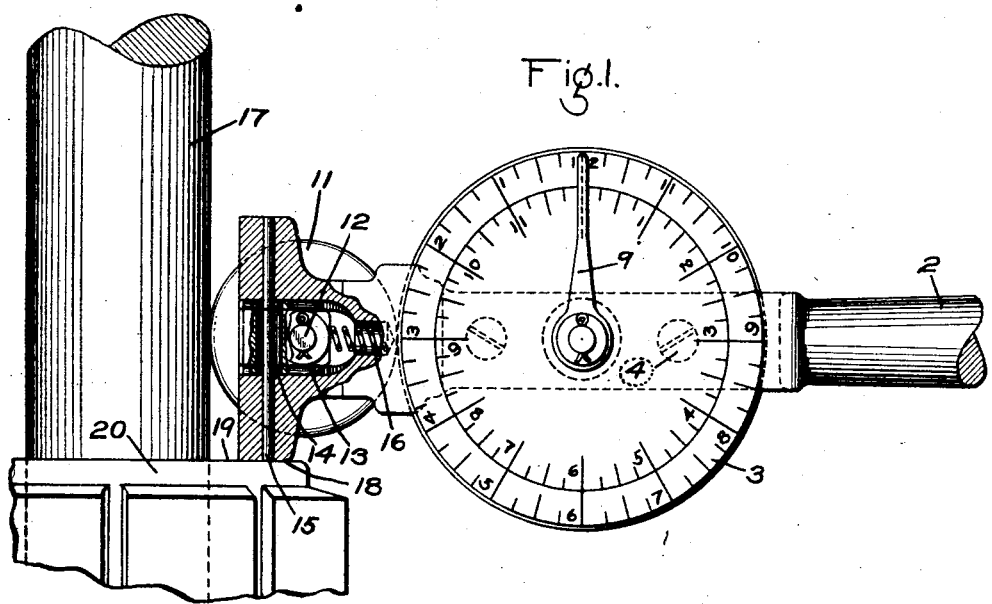
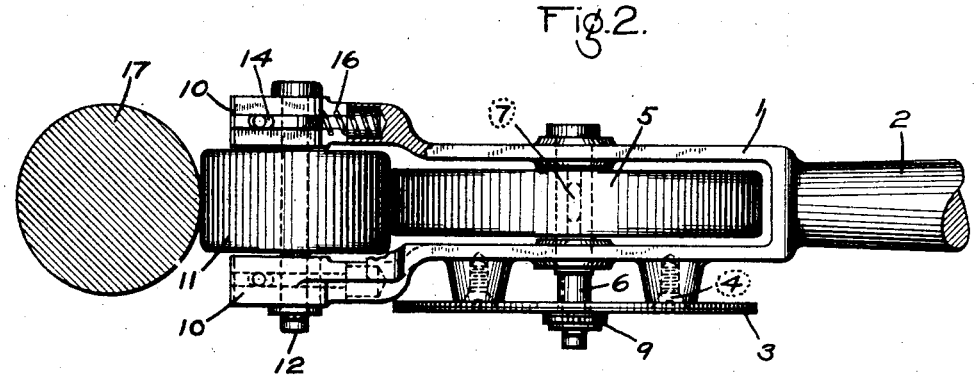
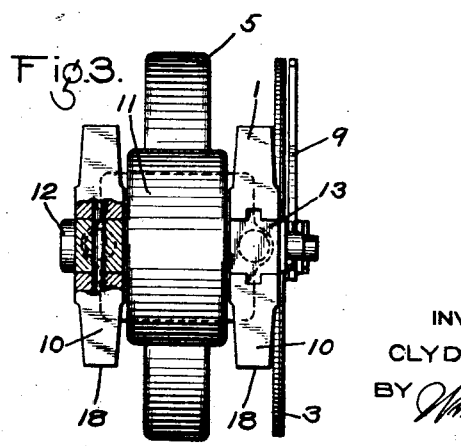
INVENTOR
CLYDE C. FARMER
BY *Wm. M. Cady*
ATTORNEY Patented May 21, 1929.

1,714,009

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

PISTON-TRAVEL INDICATOR.

Application filed November 29, 1926. Serial No. 151,340.

This invention relates to indicators, and has for its principal object to provide means for indicating the reciprocating movement of a piston rod, or the like.

In the accompanying drawing; Fig. 1 is a front elevation, partly in section, of an indicator device embodying my invention; Fig. 2 a plan view of the construction shown in Fig. 1; and Fig. 3 an end view of the construction shown in Figs. 1 and 2.

As shown in the drawing, the construction may comprise a main yoke-shaped body member 1, provided with an integral handle 2, said member having a graduated dial 3 secured to one side by means of screws 4.

Rotatably mounted between the two arms of the yoke 1 is a roller 5 carried by a shaft 6, said shaft being secured to the roller by a key 7 and being mounted in bearings in the yoke 1. One end of the shaft 6 extends through an opening in the graduated dial 3 and secured thereto is a pointer 9 adapted to rotate with the roller 5.

Mounted between the outer ends of the arms 10 of the yoke 1 is a roller 11, mounted on a shaft 12 and adapted to engage the roller 5, said shaft 12 having its opposite ends mounted in bearings provided in sliding carriage blocks 13. Each carriage block has an elongated slot 14 through which a pin 15 extends, said pin being secured in each arm of the yoke 1. The pins 15 provide the means for holding the carriage blocks in place, and the elongated slots 14 permit the desired longitudinal movement of the roller 11 to bring said roller into engagement with the roller 5. A spring 16 is interposed between each sliding carriage block 13 and each yoke arm, so that normally said carriage blocks are maintained in such position that the roller 11 is held out of contact with the roller 5.

If it is desired to measure the travel of a reciprocating member, such as a piston rod 17, the indicator is grasped by the handle 2 and with the faces 18 of the yoke arms 10 resting against a stationary object, as for example the face 19 of a stuffing box 20 around the piston rod 17, and with the roller 11 in contact with the piston rod, a pressure is exerted on the handle 2 so that the carriage blocks 13 are moved against the force of springs 16 and the roller 11 is caused to make frictional contact with the roller 5.

The roller 11 being in engagement with the piston rod 17, when said piston rod moves longitudinally the roller 11 is caused to rotate, and thereby the roller 5 is rotated through the frictional engagement with the roller 11.

The dial 3 is provided with graduations, as for example, such that for every inch lineal travel of the piston rod 17, the pointer 9 rotates through an arc corresponding with the spacing from one graduation to the next succeeding graduation. Thus the inches travel of the piston rod 17 is indicated by the number of graduations on dial 3, over which the pointer passes. It will be evident that the device will indicate travel regardless of the direction of movement of the rod 17.

Having now described my invention, what I claim as new and desire to secure by Letters Patent, is:

A device for indicating the travel of a moving element comprising a main member, having a yoke portion, a roller mounted between the arms of the yoke, a dial fixed to said yoke, a pointer rotatable with said roller and mounted adjacent to said dial, a contact roller mounted between the arms of the yoke and movable to engage the first roller, and adapted to be rotated by engagement with said moving element.

In testimony whereof I have hereunto set my hand.

CLYDE C. FARMER.